United States Patent
Kusamichi et al.

[11] Patent Number: 6,144,690
[45] Date of Patent: Nov. 7, 2000

[54] MELTING METHOD USING COLD CRUCIBLE INDUCTION MELTING APPARATUS

[75] Inventors: Tatsuhiko Kusamichi; Koichi Sakamoto; Hitoshi Ishida; Shingo Ninagawa; Motohiro Nagao; Katsuyuki Yoshikawa, all of Kobe, Japan

[73] Assignee: Kabushiki Kaishi Kobe Seiko Sho, Kobe, Japan

[21] Appl. No.: 09/400,995

[22] Filed: Sep. 21, 1999

[30] Foreign Application Priority Data

| Mar. 18, 1999 | [JP] | Japan | 11-074351 |
| Mar. 18, 1999 | [JP] | Japan | 11-074352 |
| Jul. 27, 1999 | [JP] | Japan | 11-212542 |

[51] Int. Cl.$^7$ ................................. H05B 6/06
[52] U.S. Cl. .................. 373/147; 373/142; 373/146; 373/150; 373/156
[58] Field of Search .................. 373/138, 139, 373/142, 146, 147, 148, 150, 156, 59, 7; 266/201, 202; 75/10.24; 164/270.1

[56] References Cited

U.S. PATENT DOCUMENTS

| 5,160,532 | 11/1992 | Benz et al. | 75/10.24 |
| 5,280,496 | 1/1994 | Schlecht et al. | 373/158 |
| 5,310,165 | 5/1994 | Benz et al. | 266/201 |
| 5,325,906 | 7/1994 | Benz et al. | 164/270.1 |
| 5,332,197 | 7/1994 | Benz et al. | 266/201 |
| 5,348,566 | 9/1994 | Sawyer et al. | 75/10.24 |
| 5,366,206 | 11/1994 | Sawyer et al. | 266/202 |
| 5,394,432 | 2/1995 | Fukuzawa et al. | 373/156 |
| 5,479,438 | 12/1995 | Blum et al. | 373/156 |
| 5,563,904 | 10/1996 | Colpo et al. | 373/146 |
| 5,889,813 | 3/1999 | Fujita et al. | 373/156 |
| 5,901,169 | 5/1999 | Kobayashi | 373/142 |

FOREIGN PATENT DOCUMENTS

| 5-10676 | 1/1993 | Japan. |
| 7-249483 | 9/1995 | Japan. |
| 8-261656 | 10/1996 | Japan. |
| 10-38467 | 2/1998 | Japan. |

OTHER PUBLICATIONS

Roberts, R.J., "Larger–Scale Cold Crucible Melting of Titanium and its Alloys," *AFS Transactions*, vol. 104, pp. 523–526 (Apr. 20–23, 1996).

Jacobs, M.H., Dowson, A.L., Gouma, P.I., Loretto, M.H., "Induction Cold–Crucible Melting and Pouring of Titanium Alloys for Spray Forming and Gas Atomised Powder Production," *International Congress of Electromagnetic Processing of Material, Paris*, vol. 1, pp. 243–248 (May 26–29, 1997).

Tadano, H., Take, T., Fujita, M., Hayashi, S., "Development of Large, Cold Crucible Levitation Melting Surface," *International Congress of Electromagnetic Processing of Material, Paris*, vol. 1, pp. 377–382 (May 26–29, 1997).

*Primary Examiner*—Tu Ba Hoang
*Attorney, Agent, or Firm*—Reed Smith Hazel & Thomas LLP

[57] ABSTRACT

The present invention relates to a melting method by which the melting raw materials having a variety of configurations are collectively melted to enable the composition to be adjusted in the melt, and a melting apparatus and tapping method by which tapping is readily controlled, wherein the raw materials are melted by flowing an electric current satisfying the frequency range defined by the equation below using a crucible with an inner diameter of 400 mm or more in melting using a cold crucible induction melting apparatus, the melt being tapped through a tapping nozzle provided at the bottom of the crucible and equipped with a tapping coil wound around the circumference of the nozzle:

$$7.8 - 2 \times \log(D) \leq \log(F) \leq 8.7 - 2 \times \log(D)$$

(wherein F denotes the frequency of a power supply and D denotes the inner diameter (mm) of the crucible).

5 Claims, 12 Drawing Sheets

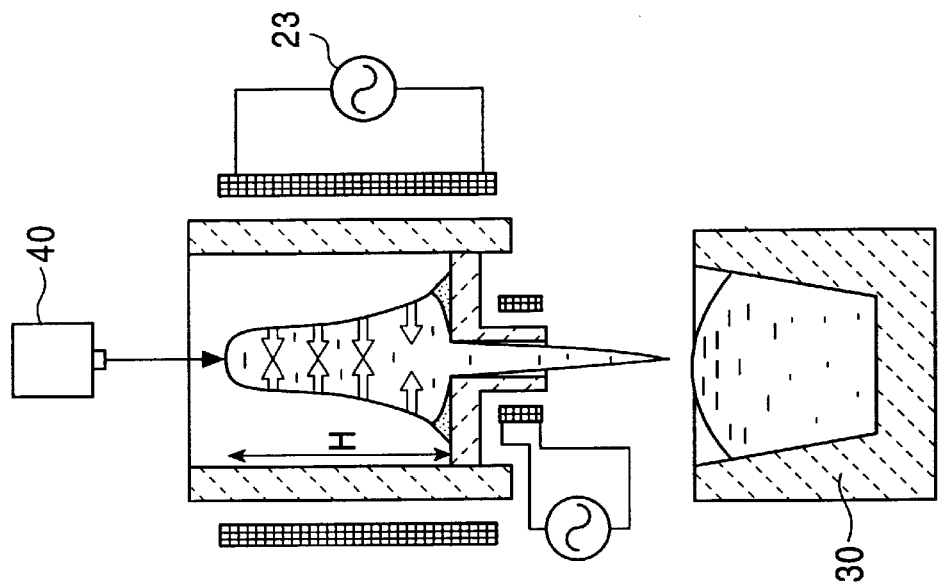
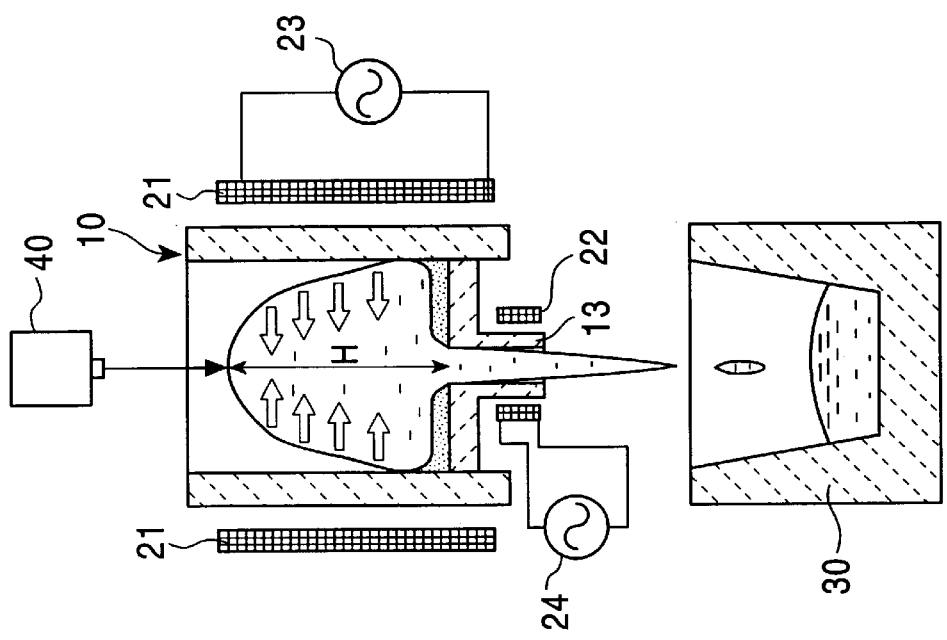

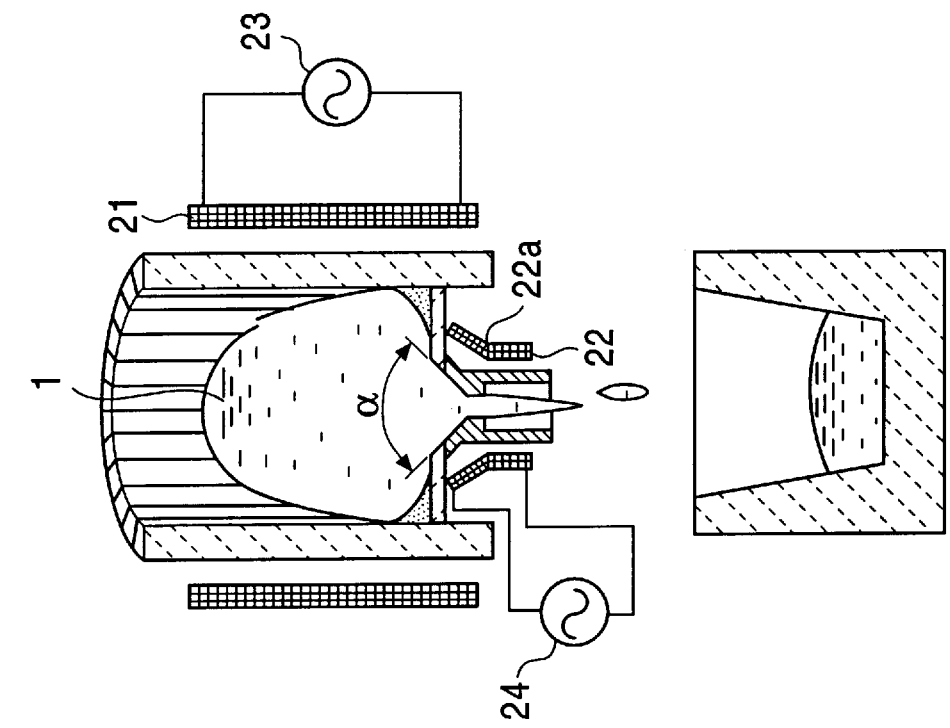
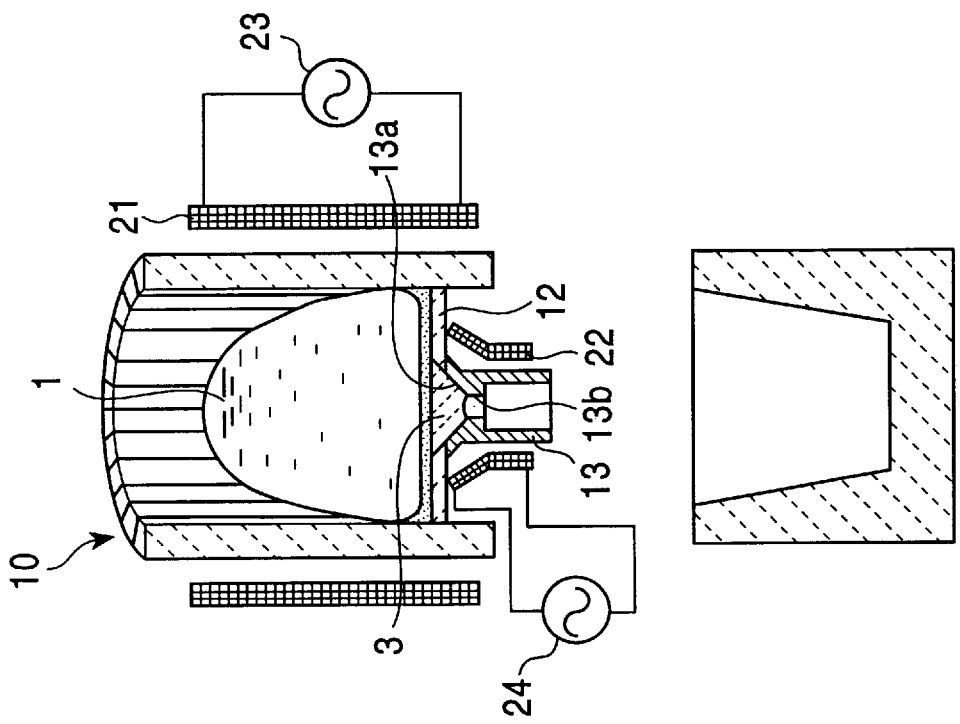

6,144,690

MELTING METHOD USING COLD CRUCIBLE INDUCTION MELTING APPARATUS

BACKGROUND OF THE INVENTION

1. Field of the Invention

The present invention relates to a cold crucible induction melting apparatus, a melting method and tapping method using the same, and metals and alloys produced by using the cold crucible induction melting apparatus.

2. Description of the Related Art

A vacuum arc melting method, an electron beam melting method and a plasma arc melting method suitable for industrial scale melting of active metals such as titanium and alloys thereof have been frequently used.

However, preparing a large volume of molten metal bath is difficult since merely the surface of a molten metal is in principle heated on these melting methods. Consequently, a melt casting method, in which the bulk material is collectively melted and, after adjusting the composition in the melt, an ingot is produced by tapping, can not be used. Instead, the composition is adjusted in the bulk material itself to be melted, followed by sequential melting and solidification to produce the ingot. Although the melt-casting method described above has been sometimes used for practical melting methods of active metals such as titanium and alloys thereof, there remains a significant limitation from the viewpoint of effectively utilizing scraps having various configurations and compositions.

While use of lime-based refractory materials for the crucible have been attempted in melting active metals such as titanium and alloys thereof, the melt so vigorously reacts with the refractory material of the crucible when the temperature of the molten metal bath is raised to 1700° C. or more that the oxygen content in the melt reaches to several thousands of ppm, making the metal to be out of the specification of the metallic material because the molten metal reacts with the material of the crucible to contaminate the molten metal bath itself.

Accordingly, a melting method commonly referred to a cold crucible induction melting method has been used for industrial purposes. The cold crucible induction melting method is also referred to an induction skull melting method. Therefore, the cold crucible induction melting method to be described hereinafter comprises the induction skull melting method.

A crucible assembled into an approximately cylindrical shape with conductive metal segments divided along the longitudinal direction is disposed in an induction coil to construct the cold crucible induction melting apparatus. An eddy current is generated in each segment of the crucible by the induction coil. The eddy current in the segment further induces another eddy current through the material to be melted in the crucible to generate a Joule heat for heat-melting the metallic material. This induction melting apparatus is referred as the cold crucible induction melting apparatus because the crucible is so constructed as to circulate a refrigerant such as water in order to prevent the crucible itself from being melted.

The cold crucible induction melting apparatus is placed in a vacuum chamber and is used for melting, for example, an active metal (metals such as Ti, Cr and Mg that are turned into a powder by being oxidized in the air). It can be utilized in melting of various melting raw materials for casting after adjusting their composition by collectively melting them. Therefore, the method is expected to be industrially useful for melting Ti scraps without pretreatment. The crucible should be large enough for melting the Ti alloy having a uniform composition in large scale in order to melt the Ti scrap. Accordingly, establishment of a melting technology using an industrially available size of crucibles have been desired. A melting technology available for producing an ingot with a weight of at least about 100 kg is required for practically melt-casting the Ti scrap in an industrial scale, which requires a technology that can collectively process at least about 150 kg of the melt weight for producing the foregoing scale of the ingot. Since the crucible is required to have an inner diameter of at least 400 mm for treating the melt having the volume described above, the melting technology should be available for this production scale. Once scale-up of the crucible has been realized, it is naturally expected to be adaptable for a variety of casting method including a continuous casting method. Therefore, a technology by which the melt can be tapped with a constant flow rate from the start to the end of tapping and a technology by which tapping can be halted or resumed on the way of tapping should be established.

Three tapping methods of the cold crucible induction melting apparatus as hitherto described are illustrated in FIG. 1, FIG. 2A, FIG. 2B and FIG. 2C, and FIG. 3. FIG. 1 shows a tilt-tapping method by which the melt is tapped by tilting the whole crucible. FIG. 2A–C a bottom-tapping method by which the melt is tapped from a nozzle attached at the bottom of the crucible. FIG. 3 shows a bottom-tapping method in a levitation type cold crucible.

Since the solidified skull 2 is markedly grown due to increased contact area between the melt 1 and the side wall 11 of the crucible due to tilting of the crucible unit (crucible 10 and melting coil 21 ) during tapping in the tapping method shown by the reference numeral 2a in FIG. 1, the amount of tapped melt is accordingly decreased. Therefore, it is desirable in the tilt-tapping method to tap the melt as soon as possible to shorten the residence time of the melt in the crucible while it is tilted. The overall melt should be tapped within several seconds by a momentary tilting. When tapping is once halted in this tapping method, the contact area between the melt and the wall of the crucible becomes so large while the crucible unit remains to be tilted that the solidified skull is markedly grown. Therefore, the solidified skull 2a should be melted again for resuming tapping after returning the tilted crucible to its original position, requiring much time for resuming tapping after the halt of tapping.

In the cold crucible induction melting apparatus using the conventional bottom tapping method (FIG. 2A to FIG. 2C), a melting subject is melted by allowing it to contact with the bottom and inner wall of a crucible while forming a solidified skull 2 on the surface of the melting subject, followed by allowing a nozzle tap 3 disposed at the top of a tapping nozzle 13 to melt with a melting coil (operated at, for example, 1800 kW and 1 kHz) 21 and a tapping coil (operated at, for example, 400 kW and 4 kHz) 22 for tapping. Since the tapping rate in this method is proportional to the square root of the height from the nozzle hole to the surface of the melt (the height of melt surface), the tapping rate will be decreased as tapping is proceeded to reduce the height of the melt surface.

Although tapping becomes easy by expanding the diameter of the nozzle, it becomes impossible to halt tapping on its way when the nozzle diameter is too large. Even if halting of tapping is possible by forming a solid phase (the reference numeral 2b in FIG. 2C) by cooling, the heat transfer rate from the solid phase in the nozzle to the tapping nozzle made of water-cooled copper is far more larger than the heat transfer rate from the nozzle tap 3, which is initially inserted without making a contact with the inner face of the nozzle, to the water-cooled copper nozzle. In addition, the solid phase located upward of the nozzle is positioned apart from the melting coil 21 besides the induction current from the tapping coil 22 can not be sufficiently generated in the solid phase. Accordingly, melting of the solid phase is so difficult that resume of tapping is considered to be impossible.

Control of the tapping nozzle becomes easy, continuous casting is readily carried out and halting of tapping on its way is also easy along with being favorable for pouring the melt into a mold little by little when the diameter of the tapping nozzle is small. However, it is a problem that tapping becomes impossible because the area where the solidified skull makes a contact with the inner surface of the nozzle and the bottom of the crucible becomes rather wide, the amount of heat transfer to the water-cooled copper crucible and the tapping nozzle is increased and the solidified skull in the tapping nozzle can not be completely melted. Accordingly, it was necessary in tapping from the tapping nozzle with a small diameter to supply a large electric power exceeding the power required for melting since the heat supplied to the solidified skull from the melting coil, or the energy density (the amount of coil current), has an upper limit. However, the melt in the crucible vigorously undulates when an electric power more than necessary is supplied to the cold crucible melting furnace, causing a decrease of power efficiency while allowing the melt to splash out of the crucible.

In the levitation type cold crucible induction melting apparatus (FIG. 3), a high frequency coil (operating at, for example, 1000 kW and 30 kHz) is used for the upper melting induction coil 25 and a relatively low frequency coil (operating at, for example, 1000 kW and 3 kHz) as compared with the induction coil described above is used in order to endow the lower induction coil 26 with a large levitation force for melting the metal while allowing it to float. Since it is difficult, however, in the levitation type cold crucible induction melting apparatus to float a large quantity of molten metal, a melting apparatus merely available for about 50 kg of the melting subject is currently operating and the apparatus has not been applied for industrial scale production. Since two contradictory functions of levitation function and tapping function are expected for the lower induction coil 26, it is quite difficult to stably hold the levitation melt during tapping to make control of the tapping rate difficult in this method. It is pointed out that output control of the upper induction coil 25 and lower induction coil 26 for resuming levitation, melting and tapping is very difficult once tapping has been halted.

As hitherto described, it is impossible to efficiently control the tapping rate and to tap, halt and resume tapping within a short period of time. Degree of freedom in casting is small, or fractional casting and tapping into a continuous casting machine are difficult, thus currently narrowing the applicable range of the methods.

SUMMARY OF THE INVENTION

Accordingly, the object of the present invention carried out by noticing the foregoing problems is to provide a melting method by which melting materials having various configurations are collectively melted to adjust the composition in the melt, thereby obtaining a highly pure and homogeneous melt in an industrial scale while providing a melting apparatus and a tapping method by developing a method for aggressively controlling the tapping rate for simplifying application of the tapping method to various casting method such as a continuous casting method by tapping at a constant rate, wherein the tapping can be halted on the way of tapping besides enabling tapping to resume within a short period of time.

The present invention has the following constructions for attaining the foregoing objects.

In one aspect, the present invention provides a melting method using a cold crucible induction melting apparatus provided with a melting coil wound around the circumference of the crucible made of a conductive metal wherein, by using a crucible with an inner diameter of 400 mm or more, a solid phase area comprising a solidified mass of a melting subject itself is formed on the bottom of the crucible, the melting subject being melted by flowing through the melting coil an electric current represented by the following equation while allowing the melt to be held on the solid phase:

$$7.8-2\times\log(D) \leq \log(F) \leq 8.7-2\times\log(D)$$

(wherein F denotes the frequency of a power supply and D denotes the inner diameter (mm) of the crucible)

The present invention also provides a method for tapping the melt prepared in the method described above, wherein a tapping nozzle is attached at the bottom of the crucible while winding a tapping coil around the circumference of the tapping nozzle, and the skull solidified in the tapping nozzle is tapped after heat-melting by flowing an electric current through the tapping coil.

Also, the present invention provides a tapping method using the cold crucible induction melting apparatus, wherein the tapping rate is controlled by detecting the height of the melt surface and controlling the height of the melt surface by the controlling the electric current through the melting coil depending on the height of the melt surface.

Also, the present invention provides a tapping method for controlling the tapping rate to be constant by maintaining the melt surface at a constant level.

Also, the present invention provides a tapping method using the cold crucible induction melting apparatus, wherein the melt in the tapping nozzle is solidified for halting tapping by reducing the amount of the electric current (including to halt the electric current) through the tapping coil, and tapping is resumed by allowing the solid phase in the tapping nozzle to melt by increasing the amount of the electric current through the tapping coil.

In accordance with another aspect, the present invention provides a cold crucible induction melting apparatus in which a coil is wound around a crucible unit having a tapping nozzle at the bottom of the crucible, a coil being also wound around the tapping nozzle, wherein a wide upper introduction gate and a narrow lower discharge port are provided at the tapping nozzle while allowing the amount of the electric current through the tapping coil so as to be able to control for increasing or decreasing it.

Also, the present invention provides a cold crucible induction melting apparatus, wherein a tapered face is provided at the circumference wall on the way from the upper introduction gate to the lower discharge port along the direction to close the flow path.

Also, the present invention provides a cold crucible induction melting apparatus, wherein an insulation coating film is formed on the inner surface of the tapping nozzle.

The present invention also provides titanium and a titanium alloy produced by using the cold crucible induction melting apparatus described above.

BRIEF DESCRIPTION OF THE DRAWINGS

FIG. 6A and FIG. 6B show an illustrative drawings of a cold crucible melting and bottom tapping apparatus in relation to the control method of the tapping rate according to the present invention, wherein FIG. 6A and FIG. 6B denote before the start of tapping and during the tapping, respectively.

FIG. 7A and FIG. 7B show an illustrative drawing of a cold crucible melting and bottom tapping apparatus in relation to the tapping method and tapping resuming method according to the present invention, wherein FIG. 7A and FIG. 7B denote before the start of tapping and during the tapping, respectively.

DESCRIPTION OF THE PREFERRED EMBODIMENT

Figure 1:
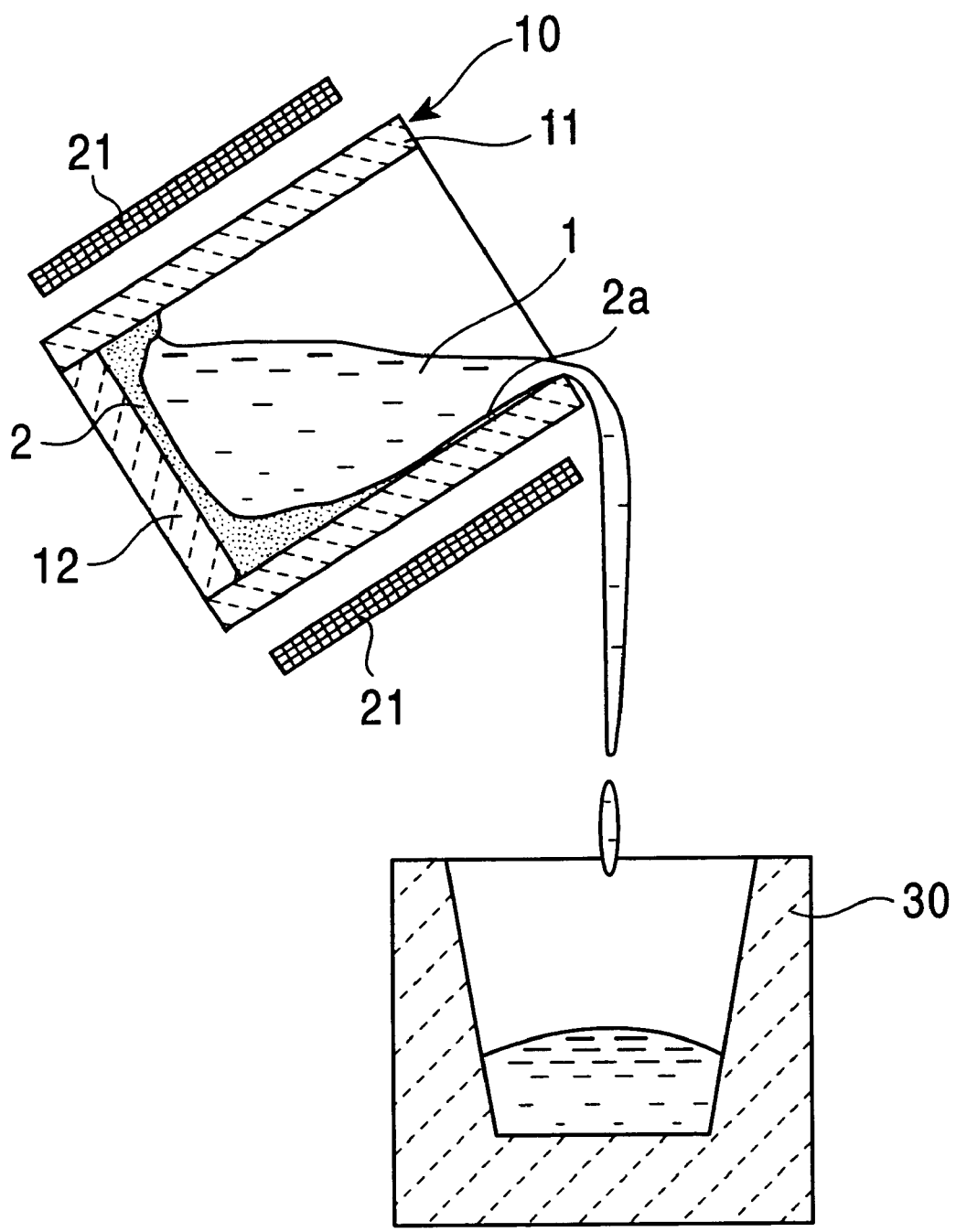
FIG. 1 shows an illustrative drawing indicating an example of tapping from a cold crucible induction melting apparatus using a tilting method (a conventional method).
Figure 2A:
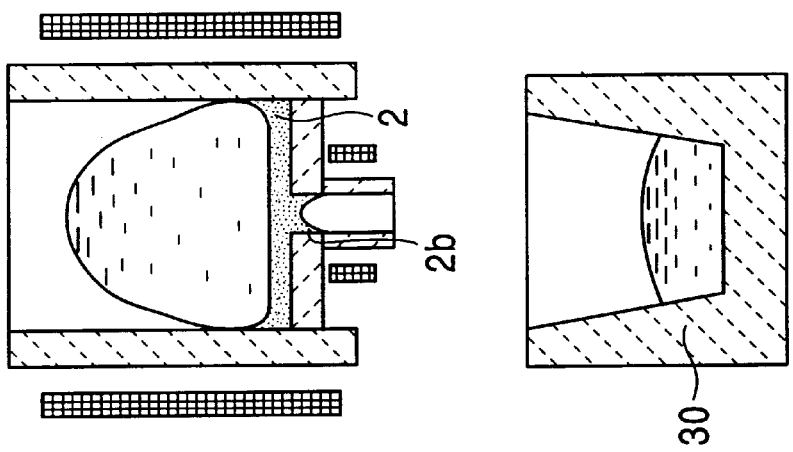
FIG. 2A through FIG. 2C are illustrative drawings showing an example of bottom tapping by conventional cold crucible melting, wherein FIG. 2A denotes before the start of tapping, FIG. 2B denotes during tapping and FIG. 2C denotes that resuming of tapping is impossible.
Figure 2B:
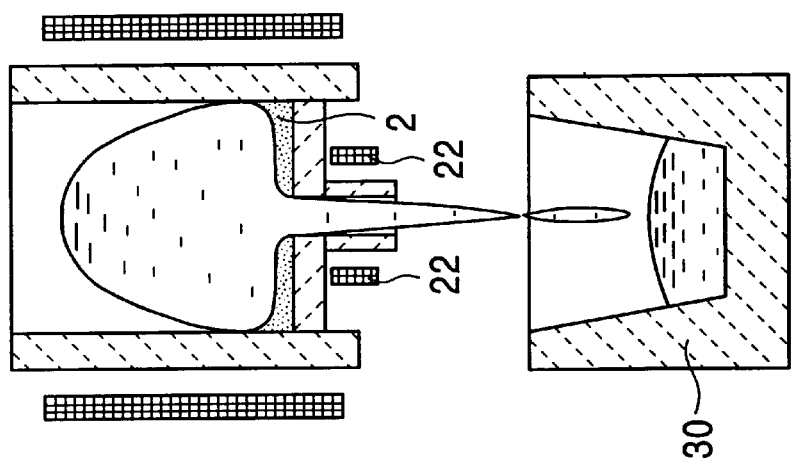
Figure 2C:
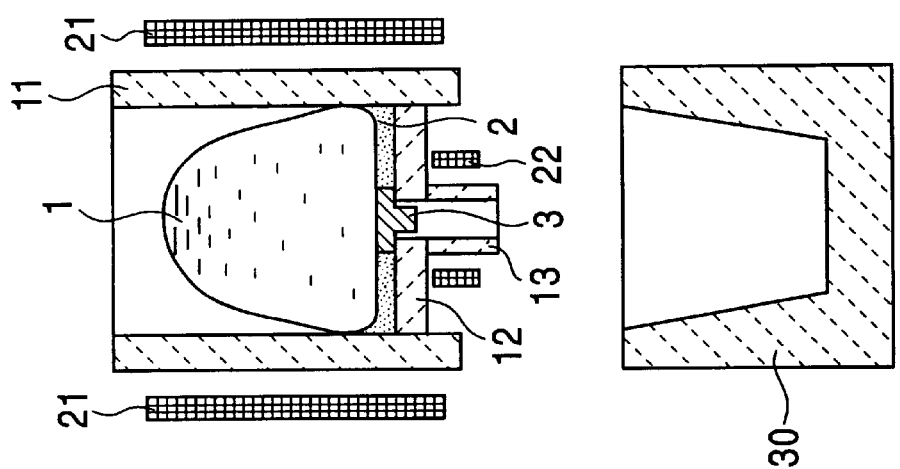
Figure 3:
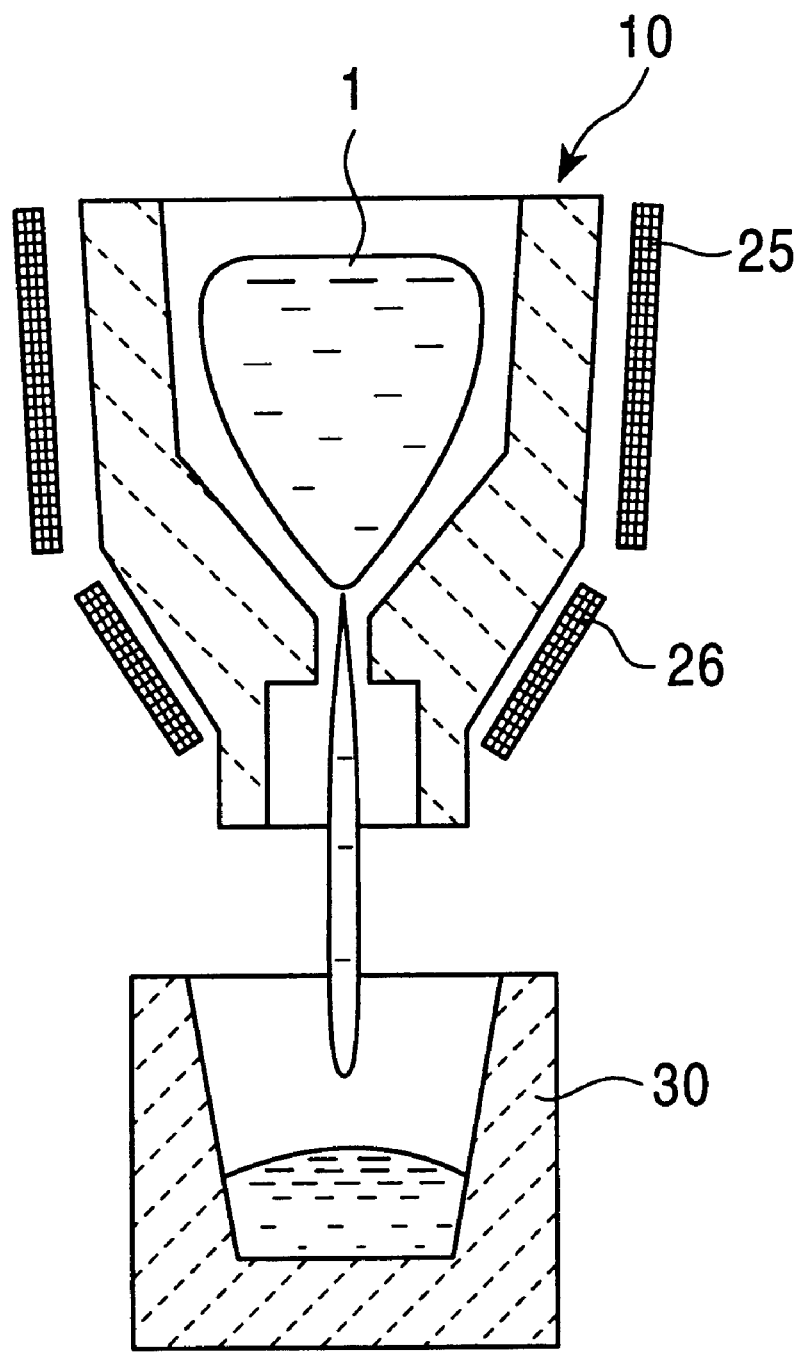
FIG. 3 shows an illustrative drawing indicating an example of bottom tapping in a levitation type cold crucible melting apparatus (a conventional method).

The preferred embodiments according to the present invention will be described hereinafter referring to the attached drawings One of the melting methods according to the present invention will be described referring to FIG. 4, which shows a schematic drawing of the melting method according to the embodiments of the present invention. A melting raw material m is placed in a feed bucket 7 in a material chamber 4 to feed a prescribed amount of the raw material to a melting crucible 10 provided in a melting chamber 5 placed just under the bucket. A melting crucible 10 constructed by combining the plurality copper segments, which are rectangular or circular columns inside of which are water-cooled, and assembling into a vertical cylinder, and a bottom plate made of a copper material inside of which is cooled with water; an induction coil 21 provided so as to surround the periphery of the crucible 10; and a tapping nozzle 13 coupled to the bottom plate of the crucible 10 are provided in a melting chamber 5. An evacuation mechanism 6 is connected to the melting chamber 5.

The melting raw material m supplied to the melting crucible 10 is melted by heating with an induction coil 21 in a reduced pressure atmosphere in the vacuum chamber evacuated with an evacuation mechanism 6. A deoxidizer is added in the melting crucible 10 while maintaining the crucible in a vacuum of $133.322 \times 10^{-3}$ to $10^{-4}$ Pa or in an inert gas atmosphere such as Ar.

The raw material m melted in the melting crucible 10 is taken out of the tapping nozzle 13 and introduced into, for example, a mold 30 in a casting chamber provided just under the nozzle for casting, and the solidified material is taken out of the mold 30 as an ingot 31. The tapping nozzle 13 are also constructed with water-cooled copper segment. The nozzle is provided with a tapping coil 22 wound around the periphery of the nozzle.

It was made clear from the investigation and experimental results by the inventors of the present invention that the induction melting technique using the melting crucible 10 constructed with water-cooled copper is applicable to an industrial scale production using a crucible having an inner diameter of 400 mm or more even when the melting raw material m is a high-melting point metal. Although the melting method of interest in the present invention was practically carried out using experimental facilities equipped with a crucible having a diameter of 300 mm or less, to date the conditions required for a constant operation using a large industrial scale furnace have not been reported at all. However, the inventors of the present invention have proved that the large scale furnace may be successful in an industrial scale production by applying the method according to the present invention.

Although the raw materials (the melting subjects) to be melted by the method according to the present invention are not especially limited, it is preferable to apply the method to metals and alloys containing as a principal component an active metallic element including titanium, zirconium, rare earth elements, silicon and aluminum; metals and alloys containing as a principal component a high melting point metallic element including chromium and vanadium; and metals and alloys containing iron, nickel and copper that require a ultra-high cleanness with a minimum amount of non-metallic contaminants, a remarkable effect being especially expected by applying the methods to metals and alloys containing as a principal component titanium such as melting of a titanium scrap.

An alloy is produced forming a molten metal bath in a crucible comprising a water-cooled copper in the melting method according to the present invention, wherein the molten metal bath is held on a layer of a solid phase 2 (a solidified shell) made of a molten metal or alloy itself formed at the portion where the melt makes a contact with the bottom of the crucible. Melting can be continued while suppressing the peripheral side face of the molten metal bath from tightly contacting with the copper crucible while holding the peripheral side face of the molten metal bath by giving undulation with an electromagnetic force generated by a low-frequency electric current through the melting coil 21. The frequency range should be appropriately determined for securely maintaining the undulation state as described above. In other words, when the frequency is too low, the molten metal bath is too vigorously agitated to largely disturb the molten metal bath, making the melt unstable by allowing it to readily make a contact with the crucible.

Figure 5:
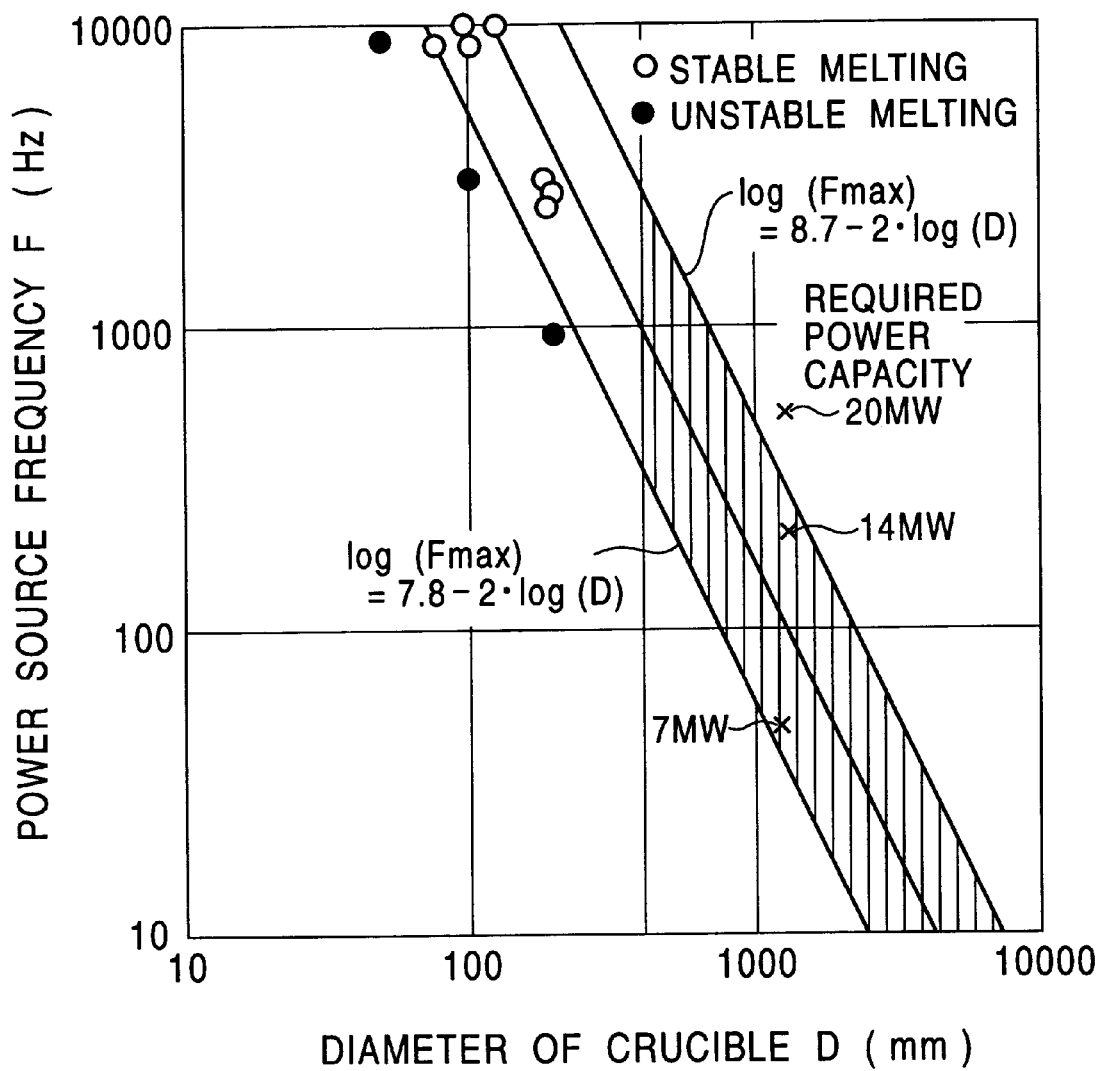
FIG. 5 shows a relation between the diameter of the melting crucible according to the present invention and the power supply frequency.

The inventors of the present invention found that, with respect to the lower limit of the frequency range, the following formula (1) is valid between the diameter of the crucible (the diameter of the body of the crucible D in mm unit) and the lower limit of the frequency ($F_{min}$ in Hz) as shown in FIG. 5.

$$7.8 - 2 \times \log(D) = \log(F_{min}) \quad (1)$$

When a frequency lower than the lower limit frequency determined by the diameter of the crucible is used, the molten metal bath is too strongly agitated by the electromagnetic force that a part of the molten metal is solidified by making a contact with the water-cooled copper crucible, thereby further increasing the heat transfer from the melt to the copper crucible to make it difficult to maintain the molten metal bath itself.

When the frequency is too high, on the other hand, electric power loss becomes so high that the method can be hardly established as an industrial process. For example, the required electric power when a water-cooled copper crucible with a diameter of 1200 mm is used are calculated for each frequency, obtaining the as shown in TABLE 1 below.

TABLE 1

| | REQUIRED ELECTRIC POWER (MW) | | | |
| --- | --- | --- | --- | --- |
| FREQUENCY (Hz) | MELTING SUBJECT (CIRCULAR COLUMN) P | COPPER CRUCIBLE $P_{cru}$ | TOTAL | POWER OUTPUT (MW) |
| 500 | 7.71 | 6.59 | 14.30 | 20.4 |
| 200 | 5.63 | 4.26 | 9.89 | 14.1 |
| 50 | 3.09 | 1.98 | 5.07 | 7.2 |

Note:
Power loss at the power supply is calculated to be 30%.

While the lower limit frequency for the crucible with a of 1200 mm is 44 Hz from the equation (1), it was made on the calculated power output at 50 Hz, 200 Hz and 500 Hz that a remarkably higher electric power is required as the frequency is increased (for example, about three times as high an electric power as at 50 Hz is required at 500 Hz). A frequency that requires too excessive power capacity is not appropriate considering the industrial applicability of the process. Since the practically acceptable power capacity is considered to be about three times of the power at the lower limit frequency, an upper limit frequency $F_{max}$ should be determined for satisfying the conditions as described above. Therefore, it is desirable to use frequency lower than the upper limit frequency $F_{max}$ represented by the equation (2) (see FIG. 5).

$$\log(F_{max}) = 8.7 - 2 \times \log(D) \quad (2)$$

Based on the idea as described above, the inventors of the present invention found that metals and alloys as a principal component an active metal element such as titanium, zirconium, a rare earth element, silicon and aluminum, metals and alloys containing as a principal component a high melting point metal element such as chromium and vanadium, and metals and alloys containing iron, nickel, cobalt and copper that requires an ultra-high cleanness with a minimum amount of non-metallic contaminants can be stably melted, when an appropriate frequency in the range determined by the equations (1) and (2), or a frequency in the range satisfying the following equation (3) (the range marked by parallel fine lines in FIG. 5):

$$7.8 - 2 \times \log(D) \leq \log(F) \leq 8.7 - 2 \times \log(D)$$

It is preferable in the melting method according to the present invention that a layer of a solid phase (a solidified shell) of the molten metal or alloy is formed at an area where the melt makes a contact with the water-cooled crucible. The solid phase is left behind after the molten metal bath in the crucible has been tapped and the size of the solid phase is reduced to smaller than the inner diameter of the water-cooled copper crucible by contraction due to solidification with cooling. Accordingly, it is possible to take this solid phase out of the crucible after the melting work has been completed, or to insert the solid phase again in the water-cooled copper crucible before a separate melting run to heap up the melting material over the solid phase.

Since the melting raw material filled in the water-cooled crucible usually has a bulk density of about ½ to ¼ of the density of the melt, the volume of the material is reduced in the crucible by melting the charged melting material. Therefore, it is inevitable in the melting method according to the present invention to supplement the additional melting raw material.

It is possible to add fluorides, chlorides and oxides that exhibit a smelting effect of the metallic melt simultaneously with melting or after the melt has been formed in melting the metal or alloy in the water-cooled copper crucible. Examples of the fluoride include $CaF_2$, $BaF_2$, $MgF_2$, $NaF$, $KF$ and fluorides of the rare earth elements, examples of the chloride include $NaCl$, $KCl$, $CaCl_2$ and $MgCl_2$, and examples of the oxide include $CaO$, $BaO$, $MgO$, $Na_2O$, $SiO_2$ and $Al_2O_3$.

Although a stable melting becomes difficult in the conventional melting methods using a refractory material due to remarkable erosion of the refractory material with the smelting agent when a highly reactive fluoride, chloride or oxide is used for the smelting agent, the problem of erosion can be avoided from occurring in the melting method according to the present invention to enable a stable melting and smelting operation because the water-cooled copper crucible is used.

Since a stable melt of a metal or an alloy is formed in the water-cooled copper crucible by the melting method according to the present invention, it is possible to sample a part of the molten metallic alloy to promptly subject it to a composition assay. A various kinds of alloy components can be added based on the assay results, thereby enabling the melt to be adjusted to a prescribed alloy component.

The melting subject melted by the method according to the present invention is taken out of the crucible by equipping the water-cooled copper crucible for use in melting with one or more of nozzles having water-cooled taps for tapping the molten metal at the bottom of the crucible or downward of the peripheral frame of the crucible. The construction described above enables the molten metal in the melting crucible to be tapped after removing the water-cooled tap by allowing the solid phase formed at the bottom or downward of the peripheral frame of the melting crucible to be melted by the heat ascribed to the molten metal itself.

However, the tapping method described above involves some problems in controlling the tapping rate because the solidified layer is melted by the inherent heat of the melt. Therefore, it is preferable to use the tapping method as will be described below.

In the preferable tapping method, the nozzle coupled with the water-cooled copper crucible has a basic construction resembling to the water-cooled copper crucible, which is composed of a plurality of rectangular or circular copper columns inside of which are cooled with water and outside of which are provided with a heating induction coil. Skull solidified in the nozzle is heat-melted to melt also the solidified layer formed in the water-cooled copper crucible by taking advantage of the inherent heat of the melt, thereby precisely controlling the tapping rate of the melt.

The cold crucible induction melting apparatus and the tapping method according to the present invention is also provided in order to more precisely control the tapping rate according to the method as described above.

One of the tapping method according to the present invention will be described hereinafter referring to FIG. 6. A crucible 10 having a water-cooled copper segment structure is disposed at inside of the melting coil in the cold crucible induction melting apparatus shown in FIG. 6, and a tapping nozzle 13 comprising the water-cooled copper segment is disposed at the bottom center of the crucible.

Since the tapping rate from the tapping nozzle disposed at the bottom of the crucible is in principle proportional to the height H (the height of the melt surface) from the nozzle port to the melt top surface, the tapping rate will be declined as the volume of the melt is decreased by tapping and the height of the melt surface is lowered. An electromagnetic force is applied to the melt along the centripetal direction due to the melting coil in the cold crucible induction melting apparatus, thereby the melt assuming a dome shape by being separated from the wall of the crucible. The dome rises up higher as the electric current flowing through the melting coil becomes larger, assuming a column-shaped melt when the centripetal force is extremely strong. The electromagnetic force working on the melt along the centripetal direction becomes in principle weaker as the distance between the melt and the wall of the crucible is longer when a given amount of the electric current is flowing through the melting coil.

Accordingly, it is necessary to increase the electric current through the melting coil in accordance with the tapping volume in order to keep a constant height H of the melt surface irrespective of the decreased volume of the melt remaining in the crucible after tapping.

The height of the melt surface is therefore monitored at any time using a detecting apparatus 40 such as a laser displacement meter or an eddy current displacement meter throughout the tapping as shown in FIG. 6. A constant tapping rate can be obtained by keeping the height H of the melt surface at a constant level throughout the tapping period from the start of tapping as shown in FIG. 6A to the end of tapping as shown in FIG. 6B by allowing the amount of the electric current through the melting coil 21 to increase in accordance with the control equation (4) below to enhance the electromagnetic force working on the melt along the centripetal direction;

$$I_{t+t'} = I_t \times (H_0/H_{t+t'})^{1/n} \quad (4)$$

wherein t denotes the time lapse (seconds) at an arbitrary moment during the measurement as measured from a reference time, t' denotes an arbitrary time interval for controlling the electric current through the coil (a time interval for averaging the height of the melt surface), $I_t$ denotes the amount of the coil electric current (A) at an arbitrary moment during the measurement, $I_{t+t'}$ denotes the amount of the electric current (A) through the coil a after a time lapse of t', $H_0$ denotes the height of the melt surface (mm) at the start of tapping and $H_{t+t'}$ denotes the mean height of the melt surface (mm) during a time lapse of t', n being an arbitrary positive integer of 2.0 or smaller.

The height H of the melt surface is determined by a mean value in within a time interval of t' in the control equation (4) described above, because the melt is vigorously undulating by being affected by an agitating flow caused by the electromagnetic force to give a remarkable variation of the height of the melt surface every moment. Therefore, the amount of the coil electric current may be diverged by being synchronized with the undulation of the melt surface if the height of the melt surface is controlled using the momentary levels, thus requiring the height of the melt surface to be averaged throughput a given time interval. However, when the averaging time is too long, increase of the coil electric current can not follow the variation of the height of the melt surface. Therefore, a time of 2.0 seconds or less is required.

It is known with respect to the relation between the rate of change of the height H of the melt surface and the amount of the electric current through the coil that the former is proportional to the square of the latter when the volume of the melt is large enough. However, the relation does not always follow the square rule when the melt volume is changed by tapping to form a large space between the crucible and tapping nozzle. Accordingly, the electric current through the coil is not controlled by a reference electric current through the coil but is changed referring to the electric current through the coil before a time of t' to compensate decay of the electromagnetic force due to thinning of the melt, thereby enabling to control by setting the index n to 2.0 or larger.

Another tapping method and the cold crucible induction melting apparatus according to the present invention will be described hereinafter referring to FIG. 7A and FIG. 7B, and FIG. 8 through FIG. 10.

A crucible 10 comprising water-cooled copper segments are disposed at inside of the melting coil in the cold crucible induction melting apparatus shown in FIG. 7A and FIG. 7B, and the bottom of the crucible is so constructed as to have a flat and ring-shaped water cooled copper bottom plate 12, a tapered member 13a and a straight member 13b, a tapping nozzle 13 having water-cooled copper segments being coupled to the bottom of the crucible.

A nozzle tap 3 made of the same material as the raw material is placed in the tapping nozzle 13 for preventing the raw material (the melting subject) from falling off and the melt at the initial stage of melting from dripping. The raw material is placed in the crucible thereafter and is melted by flowing an electric current through the melting coil 21 (FIG. 7A). A high temperature is kept for a given time until the temperature of the melt and the shape of the solidified skull reaches to a stationary state after the raw material has been melted. Then, the nozzle tap 3 and the solidified skull layer on the nozzle tap 3 is melted by flowing an electric current through the tapping coil 22 to start tapping (FIG. 7B).

For halting on the way of tapping, the solidified skull is allowed to grow from the surface of the tapping nozzle by controlling the amount of the electric current through the tapping coil 22 to block the tapping nozzle 13. A simplified method for halting tapping involves to reduce the amount of the electric current through the tapping coil, or the electric current to the tapping coil may be stopped.

Whether halting of tapping is successful or not is determined by the amount of heat transfer from the melt and solidified skull to the bottom of the crucible 12 and the inner surface of the tapping nozzle 13 that are cooled with water cooled.

Although melting of the solidified skull formed in the straight member 13b of the tapping nozzle 13 is possible irrespective of the angle α of the tapered member 13a of the tapping nozzle 13, the winding number of the coil per unit length on the tapered member 22 is increased while shortening the horizontal length from the coil to the inner surface of the tapered member for disposing the tapping coil so as to allow the coil to run along the tapered member 13a when the taper angle a is too small. In other words, although a large amount of heat can be introduced to the solidified skull in the nozzle since consumption of the electric power at the tapping nozzle segments is reduced, heat transfer is rather increased due to increased surface area of the tapered member 13a or cooling area as the taper angle α is reduced, thereby making it impossible to tap the melt. The desirable taper angle α is therefore 70° or more.

When the taper angle α is too large, on the contrary, the winding number of the coil per unit length of the tapered member 22a of the coil is reduced and the horizontal distance from the tapping coil 22 to inner surface of the nozzle increases. Therefore, heat transfer at the tapered face of the nozzle is also made to exceed generated heat, rendering the solidified skull on the tapered face impossible to be melted and tapping becomes impossible. Therefore, the desirable taper angle is 100° or less.

As hitherto described, the angle at the tapered member is crucial in balancing heat transfer and heat generation. An angle of 70° or more and 100° or less is recommended and an angle in the range of 80° to 95° is more desirable.

It is desirable to dispose the top 22a of the tapping coil 22 at outside of the tapered member 13a as shown in FIG. 7B since the nozzle tap residing in the nozzle at the start of tapping or the solidified skull residing when tapping is resumed can be readily melted.

Figure 8:
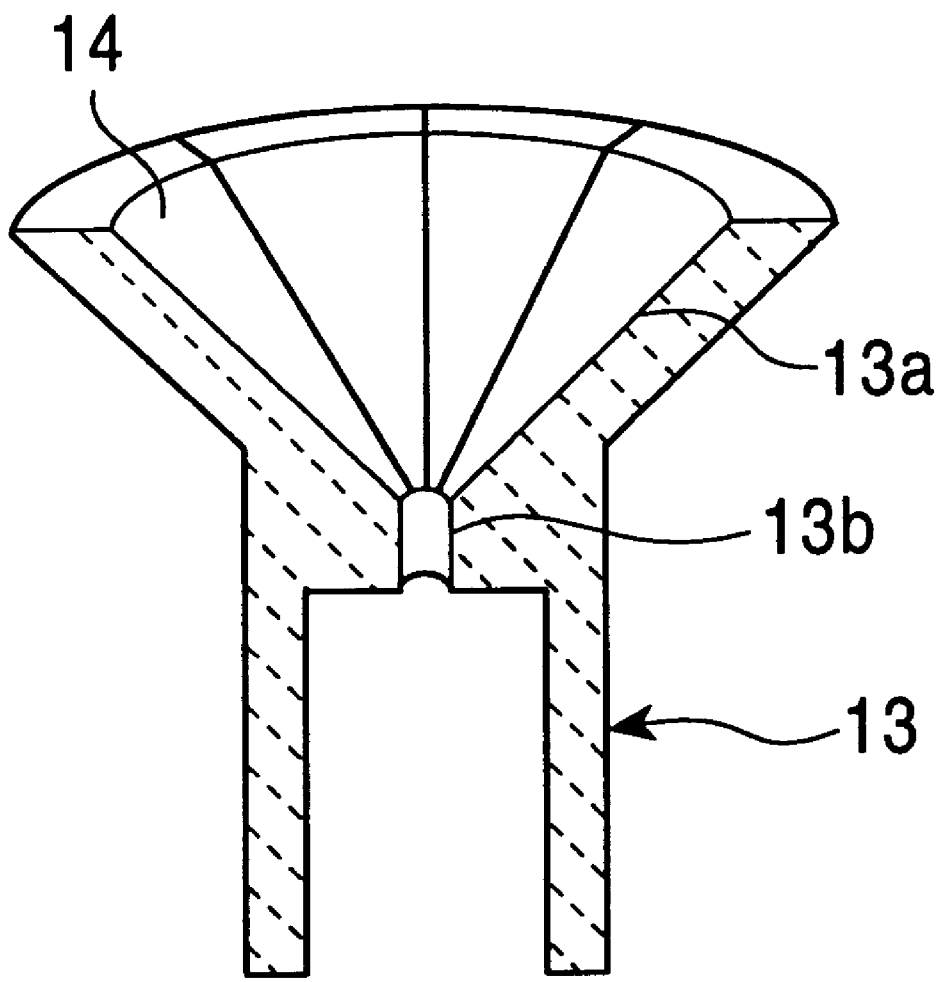
FIG. 8 shows a schematic illustrative drawing indicating the tapping nozzle of a cold crucible induction melting apparatus in which an insulation coating film according to the present invention has been formed.
Figure 9:
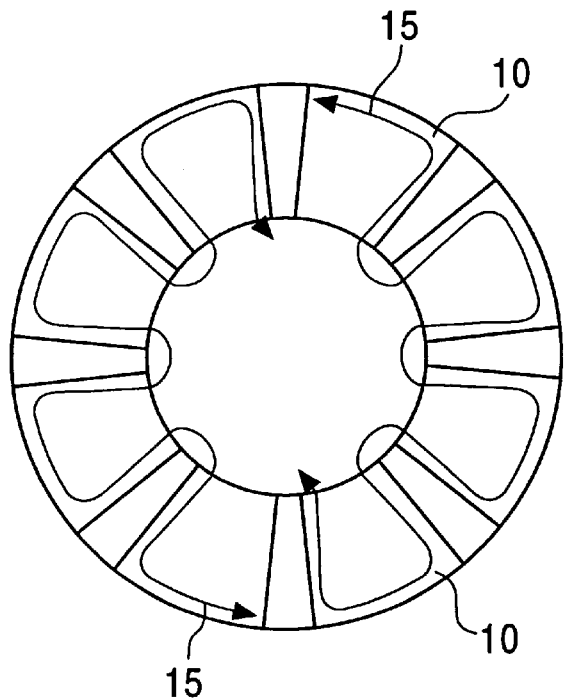
FIG. 9 shows an illustrative drawing indicating the direction of an induction electric current (or a direction of a momentary electric current) in a conventional cold crucible induction melting apparatus.

The inventors of the present invention also found that an insulation coating film 14 may be formed on the inner peripheral surface of the tapping nozzle 13 as shown in FIG. 8 in order to attain a stable tapping even when the inner diameter of the tapping nozzle is small.

Heat generation in the cold crucible induction melting apparatus is naturally given by a Joule heat due to an induction electric current flowing through the solidified skull in the nozzle or through the melt, which is determined by the amount of the induction electric current.

The water-cooled copper makes a pint contact with the solidified skull at a plurality of points due to contraction by solidification during the cooling process of the solidified skull and usually the solidified skull is substantially in an electrically insulted state from the copper wall. However, the solidified skull is gradually softened by temperature increase after starting an electric current to flow through the tapping coil since the solidified skull in the tapping nozzle should be melted for tapping using the tapping coil, thereby the point contact between the skull and the tapping nozzle turns to a face contact to form am electrical short circuit. Consequently, the induction current through the solidified skull flows along the direction indicated in FIG. 9, the induction current through the solidified skull being remarkably reduced because it immediately returns to the nozzle segments, thereby reducing the generated heat to render melting of the solidified skull impossible to inhibit tapping.

Figure 10:
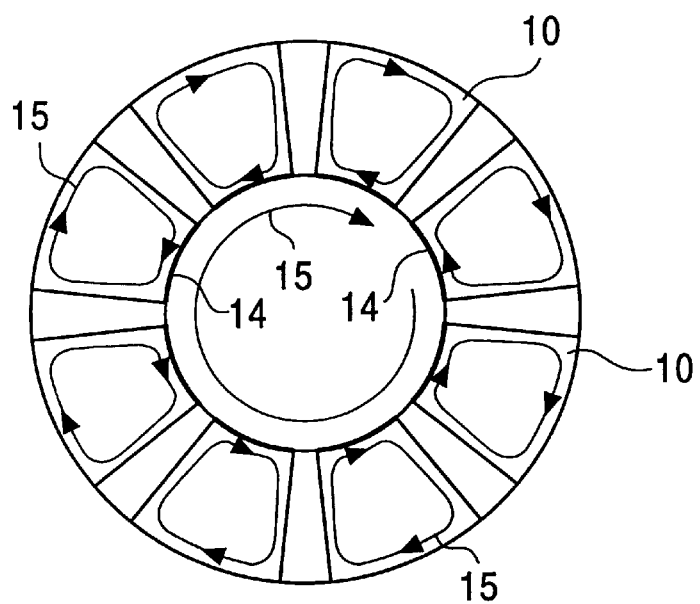
FIG. 10 an illustrative drawing indicating the direction of an induction electric current (or a direction of a momentary electric current) in a cold crucible induction melting apparatus according to the present invention.

The solidified skull and the melt are electrically insulated from the inner face of the nozzle, on the contrary, by forming an insulation coating film on the inner surface of the nozzle according to the present invention. The induction electric current does not return to the nozzle segments as shown in FIG. 10. Consequently, an induction current sufficient for melting the solidified skull can be secured to make tapping possible.

The materials of the insulation coating film to be used in the present invention include metal oxides, metal carbides, metal nitrides and metal carbonitrides. The cold crucible induction melting apparatus is usually equipped in a vacuum chamber to mostly utilize for melting high melting point and active metals such as titanium. It is therefore desirable in the present invention to use a metal oxide as the material of the insulation coating film from the view point of stability at a high temperature and an inert property to the active metals, use of $Al_2O_3$, $TiO_2$, CaO, $Y_2O_3$, $ZrO_2$ and the like being especially recommended.

The method for forming the insulation coating film, for example an insulation coating film of a metal oxide, involves suspending the metal oxide in a liquid binder and coating the suspension on the inner surface of the tapping nozzle followed by evaporating the binder. However, since powder particles of the metal oxide are used for this method, the coating film can be less repeatedly used because the particles are so weakly bound with each other that the coating film is consumed by melting and tapping.

It is desirable, on the other hand, to use a flame spray-coating of a metal oxide powder for repeatedly utilize the coating film. The flame spray-coating methods include a gas flame spray-coating method and plasma flame spray-coating method, in which the metal oxide powder is melted in the high temperature and high speed gas flame or plasma flame and the molten metal oxide is allowed to collide with the coating object to solidify there. A strong coating film can be formed by this method, enabling the coating film to be repeatedly used without cracking, peeling and wear when the high melting point metals and active metals are melted and tapped.

When the thickness of the insulation coating film is too thin, a local dielectric breakdown is caused inducing an ark to make a repeated operation and continuous operation impossible. Moreover, the coating film is readily broken by an impulse when the raw material is charged. Accordingly, the film thickness is desirably 10 $\mu$m or more, more desirably 20 $\mu$m or more.

When the insulation coating film is too thick, on the other hand, the temperature on the surface of the insulation coating film becomes so close to the temperature of the solidified skull or the melt because the insulation film has a smaller heat conductivity than the material of the tapping nozzle, especially when the insulation coating film is composed of, for example, a metal oxide. Consequently, a remarkable temperature gradient as well as an accompanied heat stress appear in the coating film to readily generate cracks and partial peeling that are a kind of self-fracture of the coating film, thereby causing contamination of the melt. Accordingly, it is desirable that the film thickness is 500 $\mu$m or less.

The smaller the nozzle diameter is, the more the magnetic flux density in the nozzle is increased to enhance the electromagnetic force acting on the melt in the nozzle. When the nozzle has a tapered member as in the present invention, an upwardly directed electromagnetic force is applied to the melt in the tapered member. Therefore, an intense electromagnetic force is generated at the straight member and in the vicinity of the boundary between the tapered member and straight member to lift-up the melt and to inhibit tapping. The surface tension is also increased to block tapping. Accordingly, the desirable nozzle diameter is 4 mm or more, more desirably 10 mm or more.

When the nozzle diameter is expanded, the total cooling area at the bottom of the crucible is reduced to increase the contribution of heat transfer from the melt to the nozzle, allowing the melt to be easily tapped. However, halting of tapping becomes impossible because the tapping rate is increased when the nozzle has a large diameter and supplies a lot of heat to the nozzle. Accordingly, the desirable nozzle diameter is 100 mm or less, more desirably 50 mm or less.

The ring-shaped water-cooled copper bottom plate 12 attached to the bottom of the crucible according to the present invention serves for shielding the electromagnetic wave emitted from the melting coil 22 and tapping coil 23, thus preventing two power supplies of the low frequency power supply 23 for melting and high frequency power supply 24 for tapping from interfering with each other to cause malfunction and error.

While a cold crucible induction melting apparatus in which the crucible and the tapping nozzle are made of copper and water is used as a refrigerant for the crucible and tapping nozzle, the materials of the crucible and tapping nozzle of the cold crucible induction melting apparatus are not limited to copper but other conductive materials may be used. The refrigerant is also not limited to water but any medium may be appropriately selected from a gas and liquid depending on its cooling ability.

It is preferable in the melting method and tapping method according to the present invention that the melting and tapping operations are carried out in vacuum or under an inert gas atmosphere.

Figure 4:
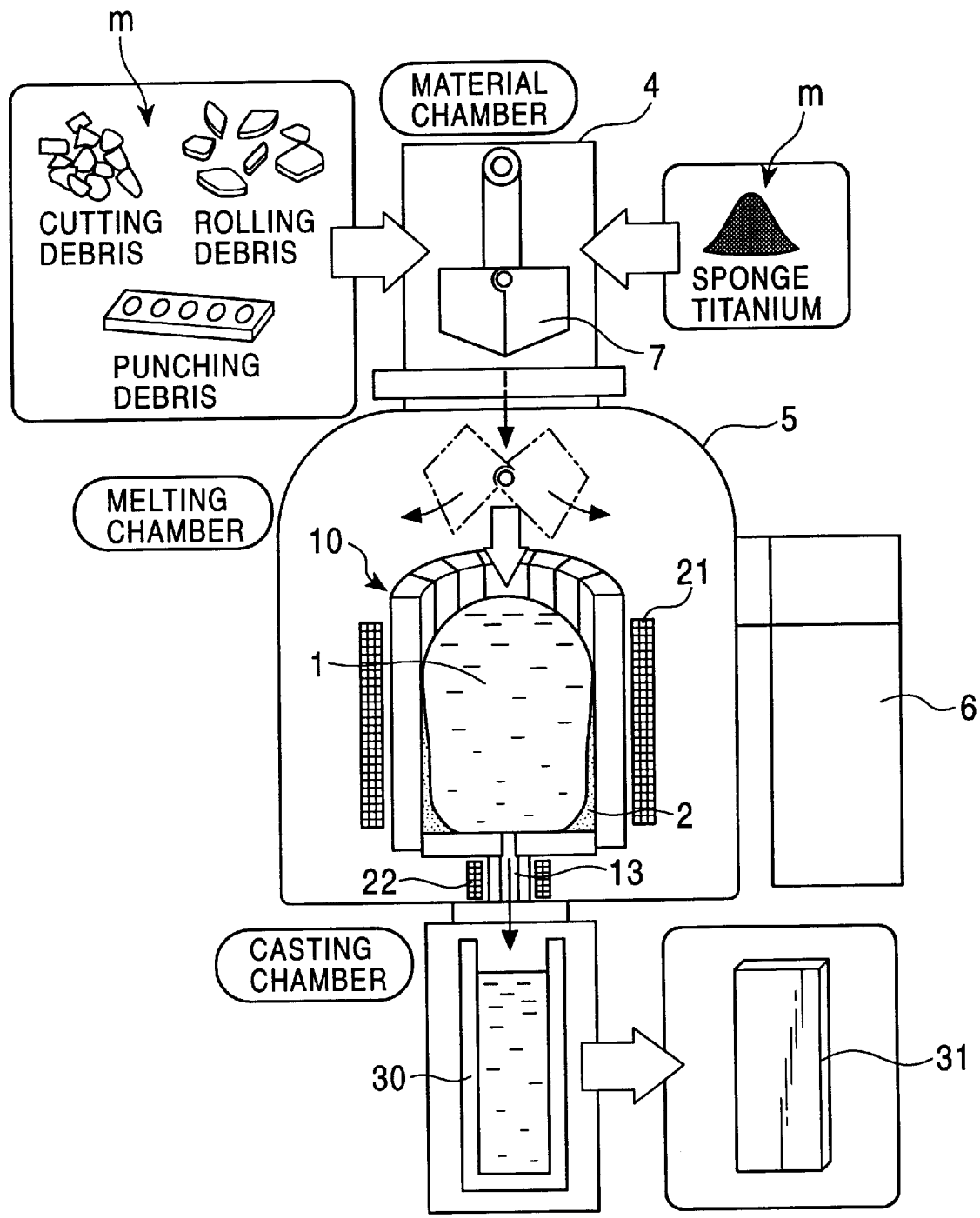
FIG. 4 shows a schematic chart of a melt-casting method according to one embodiment of the present invention.

In the melting step by the melting method and tapping method according to the present invention and in the casting step of the melting subject after the tapping step, a mold is provided under the tapping nozzle as shown in FIG. 4 and the tapped melt is solidified by injecting into the mold, thereby enabling an ingot to be readily and efficiently produced. A high purity metal and alloy can be continuously and efficiently casted by the steps comprising; injecting a molten metal tapped from the nozzle of the molten metal tapping bath into a water-cooled mold; allowing the melt to be solidified from the bottom side while maintaining the surface side to be melted; and pulling the ingot out of the mold at a speed corresponding to the injection rate of the molten metal, thereby enabling casting of the melt to be carried out in an industrial scale with a high purity and homogeneity. It is desirable for the melting raw material as hitherto described that the foregoing casting step is carried out in vacuum or under an inert gas atmosphere.

Titanium and titanium alloys are obtained in an industrial scale with a high purity and high homogeneity as described above since they are produced by using the cold crucible induction melting apparatus according to the present invention. The temperature of the melt in the casting step is lower than the casting temperature in producing conventional cast metals, because the melt is tapped through the water-cooled copper nozzle provided for tapping at the bottom of the melting crucible when titanium and titanium alloys are produced with the apparatus according to the present invention, thereby the solidification time is shortened to make the texture of the ingot fine and uniform, hardly causing any shrinkage cavities.

Although the present invention is described in more detail by way of the examples of the present invention, the examples as set forth hereinafter is not intended in any sense to limit the scope of the present invention but any modifications thereof based on the foregoing and coming spirits of the present invention will be considered to be included within the technical scope of the present invention.

EXAMPLE 1

The melting method according to the present invention will be described referring to FIG. 4.

Melting crucibles 10 with an inner diameter of 430 mm and 530 mm, respectively, are constructed with a plurality of rectangular copper columns inside of which is cooled with water. A melting coils 21 made of water-cooled copper is provide at outside of the melting crucible. A melting chamber 5 is constructed by accommodating the crucible and coil in a vacuum chamber. Melting tests of titanium, chromium and carbon steel were carried out using a melting chamber 5.

The ranges of the power supply frequencies were calculated to be 340 to 2700 Hz and 225 to 1780 Hz for the melting crucibles with inner diameters of 530 mm and 430 mm, respectively, from the equation (3). A power supply with a frequency of about 1000 Hz or 500 Hz was used for the melting crucible with an inner diameter of 430 mm while a power supply with a frequency of about 800 Hz or 400 Hz was used for the melting crucible with an inner diameter of 530 mm.

It was confirmed that melting at an output power of 1000 kw or more is possible for titanium and steel while melting at an output power of 1500 kw or more is possible for chromium when melting crucibles with diameters of 430 mm and 530 mm were used. Concerning the effect of frequencies, the melt was largely disordered by stirring although melting was possible using a power supply with a frequency of 500 Hz or 400 Hz. The melting state seemed to be somewhat unstable as compared with melting using a power supply with a frequency of 1000 Hz or 800 Hz.

It was confirmed that tapping from the bottom of the crucible is possible by a combination of a graphite crucible with a diameter of 5 to 100 mm and a water-cooled tap. It was also confirmed that tapping is possible by using a high frequency power supply with a frequency in the range of 5 to 20 kHz in a combination of a water-cooled nozzle and tapping coil.

When slugs such as $CaF_2$, $BaF_2$, $CaO$ and $SiO_2$ were added in a proportion of 5% by weight of the melt to allow the slugs to melt by the heat of the metal bath, a slag bath was formed in the vicinity of the upper wall of the crucible in the metal bath. A variety of smelting effects may be expected using the slug bath. It is possible to selectively take out the metal bath by leaving the slag bath behind by allowing the metal bath to tap from the bottom of the crucible, since the slag bath is formed at the upper wall side of the metal bath.

EXAMPLE 2

Conventional Example

Figure 11:
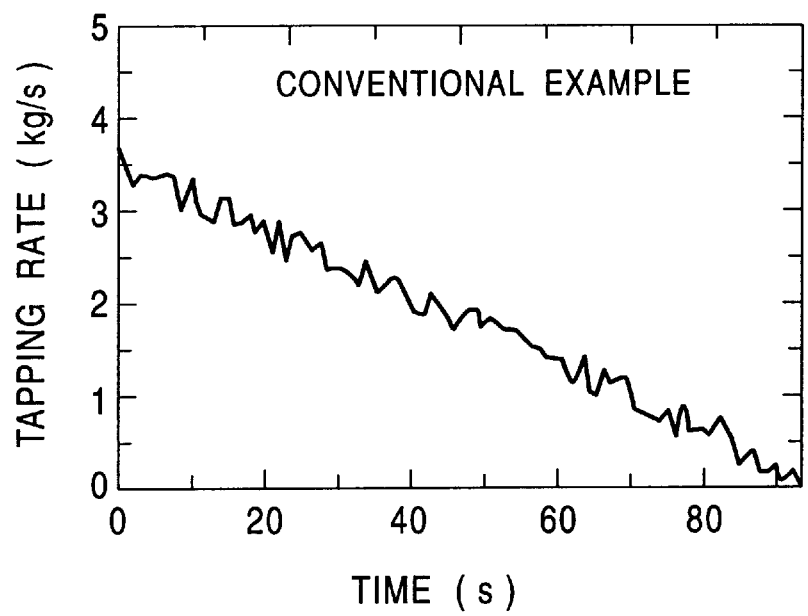
FIG. 11 shows a graph indicating a time-dependent change of the tapping rate in a conventional example.

A tapping nozzle with an inner diameter of 20 mm was provided at the bottom of a cold crucible melting furnace equipped with a crucible with an inner diameter of 400 mm. Melted and held by a high frequency power supply for melting was 200 kg of titanium, and a high frequency power supply for tapping was turned on after the melt temperature and solidified skull configuration had been stabilized to tap at an output power of 200 kw. The time-dependent tapping rate is shown in FIG. 11. The horizontal axis of the graph in FIG. 11 denotes the amount of tapping per one second. It can be understood that the tapping rate in the conventional example was decreased with time as shown in the graph.

Example

Figure 12:
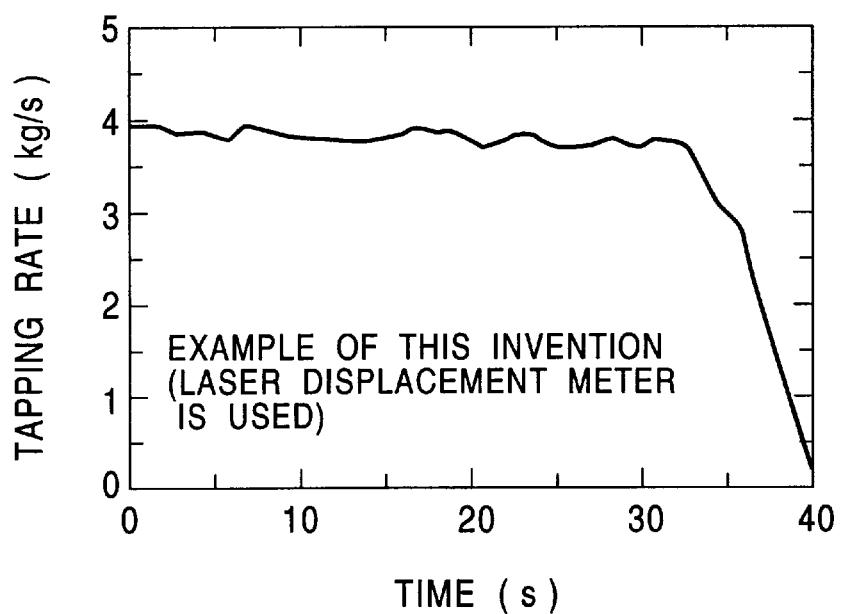
FIG. 12 shows a graph indicating a time-dependent change of the tapping rate in an example according to the present invention.

The tapping rate was measured under the same condition as in the conventional example, but the melt surface was kept constant by measuring it with a laser displacement meter followed by controlling the electric current through the coil using the values of t'=1.0 second and n=2.2 in the control equation (2) as hitherto described. The result is shown in FIG. 12. It is evident from the comparison of the results in the example and in the conventional example shown in FIG. 11 that the tapping rate is kept constant throughout the tapping time in the present example.

Figure 13:
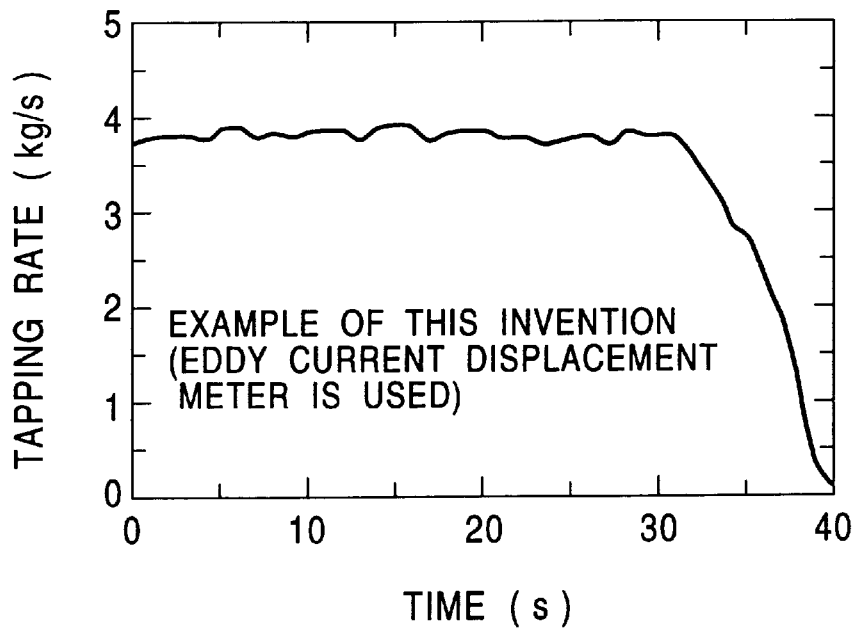
FIG. 13 shows a graph indicating a time-dependent change of the tapping rate in an example according to the present invention.

The result obtained by using an eddy current displacement meter in place of the laser displacement meter is shown in FIG. 13. It is also evident that the tapping rate is kept constant throughout the tapping time as compared with the result of the conventional example shown in FIG. 11.

Comparative Example

Figure 14:
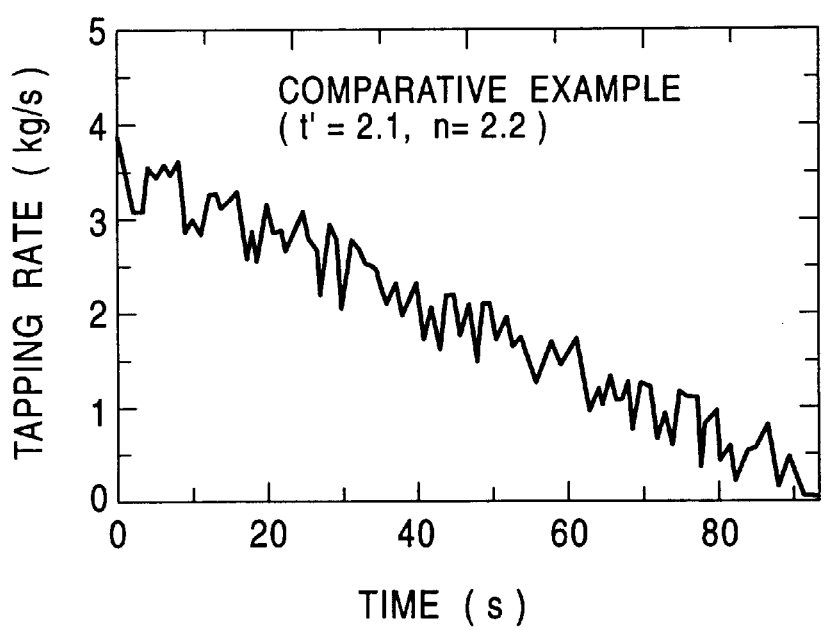
FIG. 14 shows a graph indicating a time-dependent change of the tapping rate in a comparative example.
Figure 15:
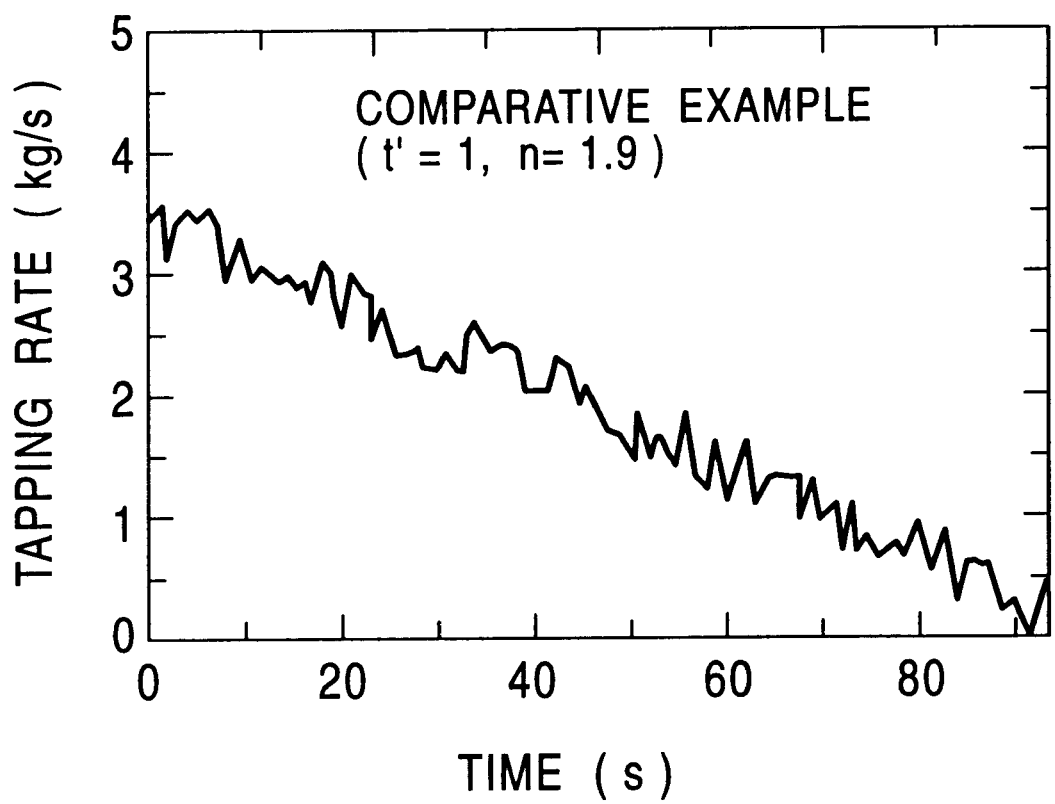
FIG. 15 shows a graph indicating a time-dependent change of the tapping rate in a comparative example.

Control of the tapping rate was impossible at all when the values of t'=2.1 seconds and n=2.2, and t'=1.0 seconds and n=1.9 were used as shown in FIG. 14 and FIG. 15, respectively.

EXAMPLE 3

Nozzles having various configurations (nozzle angle and nozzle diameter) as shown in TABLE 2 were provided at the bottom of a cold crucible induction melting apparatus equipped with a crucible with an inner diameter of 400 mm. Tapping, halting of tapping and possibility to resume tapping as well as the time required for each operations were investigated. The results are listed in TABLE 2. In a basic condition, 200 kg of titanium was melted with a coil output of 1600 kW and, after the temperature of the melt and the shape of the skull had reached to a stationary state, an electric current was started to flow through the tapping coil. The tapping initiation time was defined to be the time interval from the start of electric current flow to the start of tapping. After about five seconds when tapping flow had stabilized, the electric current flowing through the melting coil and tapping coil was stopped to halt tapping. The halting time of tapping in TABLE 2 refers to the time interval from the moment when the electric current has been turned off to the moment when tapping has been halted. Melting was resumed thereafter at a melting coil output of 1600 kW. When the temperature of the melt and the configuration of the solidified skull had reached to a stationary state, an electric current was started to flow again through the tapping coil. The resume time of tapping is defined to be the time interval from moment when the electric current flow has been resumed to the moment when tapping has been resumed. While the power output for the tapping coil is not uniform since it changes depending on the configuration of the nozzle, a maximum output available was impressed in this example using the same high frequency power supply throughout the experiment.

The sample Nos. 17 to 20 denote the examples of tapping using conventional nozzles (not tapered), in which halt of tapping was impossible at a nozzle diameter of 40 mm or more because nozzles could not be blocked since the solidified skull could not be grown at the straight nozzle member due to a weak contact of the solidified skull with the inner surface of the nozzle but the solidified skull was grown merely at the bottom of the crucible. Melting of the solidified skull and tapping of the melt were also impossible when the nozzle diameter was 25 mm or less because the distance between the tapping coil and the solidified skull at upward of the nozzle port was so remote that the heat required for melting could not be supplied to the skull.

TABLE 2

| No | NOZZLE DIAMETER (mm) | TAPER ANGLE (°) | OUTPUT OF TAPPING COIL (kW) | CAPABILITY OF TAPPING | TAPPING START TIME (s) | CAPABILITY OF TAPPING HALT | TAPPING HALT TIME (s) | CAPABILITY OF RESUME OF TAPPING | TAPPING RESUME TIME (s) |
|---|---|---|---|---|---|---|---|---|---|
| 1 | 20 | 66 | 145 | x | — | — | — | — | — |
| 2 | 20 | 70 | 140 | ○ | 37 | ○ | 10 | ○ | 58 |
| 3 | 20 | 80 | 135 | ○ | 23 | ○ | 11 | ○ | 5 |
| 4 | 20 | 90 | 130 | ○ | 15 | ○ | 8 | ○ | 2 |
| 5 | 20 | 100 | 120 | ○ | 22 | ○ | 14 | ○ | 30 |
| 6 | 20 | 110 | 110 | x | — | — | — | — | — |
| 7 | 10 | 90 | 130 | ○ | 38 | ○ | 8 | ○ | 60 |
| 8 | 5 | 90 | 130 | ○ | 45 | ○ | 5 | ○ | 80 |
| 9 | 4 | 90 | 130 | ○ | 78 | ○ | 4 | ○ | 115 |
| 10 | 3 | 90 | 130 | x | — | — | — | — | — |
| 11 | 30 | 90 | 135 | ○ | 10 | ○ | 28 | ○ | 62 |
| 12 | 40 | 90 | 140 | ○ | 9 | ○ | 35 | ○ | 59 |
| 13 | 50 | 90 | 150 | ○ | 7 | ○ | 47 | ○ | 47 |
| 14 | 70 | 90 | 160 | ○ | 8 | ○ | 53 | ○ | 32 |
| 15 | 90 | 90 | 180 | ○ | 7 | ○ | 62 | ○ | 28 |
| 16 | 110 | 90 | 200 | ○ | 8 | x | — | — | — |
| 17 | 40 | NO TAPER | 135 | ○ | 45 | x | — | — | — |
| 18 | 35 | NO TAPER | 130 | ○ | 65 | ○ | 40 | x | — |
| 19 | 30 | NO TAPER | 125 | ○ | 78 | ○ | 25 | x | — |
| 20 | 25 | NO TAPER | 120 | x | — | — | — | — | — |

The sample Nos. 1 to 6 denote the experimental results when the angle of the tapered nozzle member was changed in a range of 60° to 110° with a constant nozzle diameter of 20 mm. Although the power output of the tapping coil became large when the taper angle is 60° or less (No. 1), the solidified skull in the nozzle could not be melted since the surface area of the tapered member, or the cooling area, was increased due to smaller taper angle to render tapping impossible. Tapping was also impossible when the taper angle was 110° or more (No. 6) since the heat to be supplied to the taper face became small to render melting of the solidified skull on the taper face impossible. The time required for start of tapping, halt of tapping and resume of tapping were the shortest at a nozzle taper angle of 90° (No. 4), indicating that the nozzle has an excellent control ability.

The sample Nos. 7 to 16 denote the results when the nozzle diameters were changed in a range from 3 to 110 mm with a constant taper angle of 90°. When the nozzle diameter was 3 mm (No. 10), tapping was impossible due to the actions of the electromagnetic force and surface tension. When the nozzle diameter was 110 mm (No. 16), on the other hand, tapping was possible but resume of tapping was impossible because the solidified skull could not be grown due to large tapping flow rate.

EXAMPLE 4

Example 4a

Possibility of tapping and the time required for tapping were investigated using a cold crucible induction melting apparatus equipped with a crucible with an inner diameter of 400 mm by forming a various kind of insulation coating films on the tapping nozzle. Pure titanium (200 Kg) was used for the melting and tapping tests. The material was melted at an electric power of the melting coil of 1200 kW. An electric current flow was started at an electric power of the tapping coil of 150 kW after the temperature of the melt and the configuration of the solidified skull had reached at a stationary state. The inner face of the tapping nozzle had a taper angle of 90°. The tapping start time denote the time interval from the start of the electric current flow to the start of tapping. The results are listed in TABLE 3.

TABLE 3

| No | NOZZLE DIAMETER (mm) | ELECTRIC POWER FOR MELTING (kW) | INSULATION COATING FILM | MATERIAL OF INSULATION COATING FILM (%) | | | | | POSSIBILITY OF TAPPING | TAPPING INITIATION TIME (s) |
|---|---|---|---|---|---|---|---|---|---|---|
| | | | | $Al_2O_3$ | $TiO_2$ | CaO | $Y_2O_3$ | $ZrO_2$ | | |
| 21 | 50 | 1200 | NO | | | | | | o | 30 |
| 22 | 40 | 1200 | NO | | | | | | o | 80 |
| 23 | 30 | 1400 | NO | | | | | | o | 180 |
| 24 | 30 | 1200 | NO | | | | | | x | — |
| 25 | 30 | 1200 | YES | 100 | | | | | o | 50 |
| 26 | 30 | 1200 | YES | | 100 | | | | o | 60 |
| 27 | 30 | 1200 | YES | | | 100 | | | o | 65 |
| 28 | 30 | 1200 | YES | | | | 100 | | o | 75 |
| 29 | 30 | 1200 | YES | | | | | 100 | o | 70 |
| 30 | 30 | 1200 | YES | 20 | 20 | 20 | 20 | 20 | o | 60 |
| 31 | 20 | 1200 | YES | 100 | | | | | o | 125 |
| 32 | 10 | 1200 | YES | 100 | | | | | o | 190 |
| 33 | 5 | 1200 | YES | 100 | | | | | o | 250 |

The sample Nos. 21 to 24 denote conventional examples. While tapping was possible at an electric power of 1200 kW using a nozzle having a wide inner diameter of 40 mm or more, tapping was impossible at 1200 kW with a tapping nozzle having an inner diameter of 30 mm or less.

The sample Nos. 25 to 33 correspond to the examples of the present invention, in which a various kind of insulation coating films were formed by a plasma flame spray-coating. Tapping was possible at a melting electric power of 1200 kW. Tapping was also possible without any cracks, peeling and wear of the insulation coating film when $Al_2O_3$, $TiO_2$, CaO, $Y_2O_3$ and $ZrO_2$ were used as a pure compound or as a mixture thereof.

Example 4b

Melting and tapping of pure titanium were repeated by the same method as in Example 4a, except that coating methods by coating a liquid binder and by a gas flame spray-coating were used for forming insulation coating films. The results are shown in TABLE 4.

Although tapping was possible in the sample No. 41 in which a method for coating a liquid binder was used, the insulation coating film was partly peeled off at the first melting and tapping to render tapping impossible at the fourth run and thereafter. At least 20 times of melting and tapping were possible in the sample No. 42 in which the insulation coating film was formed by a gas flame spray-coating method, although cracks and peeling were observed at the 15th run, proving that the method was practically applicable. In the case of the plasma flame spray-coating method (No. 23), few cracks and peeling of the coating film were observed after the 50 times of melting and tapping, making it possible to melt and tap without any contamination.

Example 4c

Melting and tapping of pure titanium were repeated by the method as in Example 4a, except that a variety of the thickness of the insulation coating film was used. The results shown in TABLE 5.

TABLE 4

| No. | NOZZLE DIAMETER (mm) | MATERIAL OF INSULATION COATING FILM | FORMING METHOD OF INSULATION COATING FILM | CRACKS AND PEELING | POSSIBLE TAPPING RUNS (TIMES) |
|---|---|---|---|---|---|
| 41 | 10 | $Al_2O_3$ | COATING USING LIQUID BINDER | PARTIAL PEELING BY ONE RUN | 3 |
| 42 | 10 | $Al_2O_3$ | GAS FLAME SPRAY-COATING | CRACKS AND PEELING AFTER 15 RUNS | 20 |
| 43 | 10 | $Al_2O_3$ | PLASMA FLAME SPRAY COATING | NON | $\geq 50$ |

TABLE 5

| No. | NOZZLE DIAMETER (mm) | MATERIAL OF INSULATION COATING FILM | THICKNESS OF INSULATION COATING FILM (μm) | CRACKS AND PEELING | POSSIBLE TAPPING RUNS (TIMES) |
|---|---|---|---|---|---|
| 51 | 10 | $Al_2O_3$ | 5 | PARTIAL PEELING BY ONE RUN | 2 |
| 52 | 10 | $Al_2O_3$ | 10 | PARTIAL PEELING BY THREE RUNS | 7 |
| 53 | 10 | $Al_2O_3$ | 20 | CRACKS BY 20 RUNS AND PEELING BY 26 RUNS | 30 |
| 54 | 10 | $Al_2O_3$ | 100 | NON | ≧50 |
| 55 | 10 | $Al_2O_3$ | 300 | NON | ≧50 |
| 56 | 10 | $Al_2O_3$ | 500 | CRACKS BY 10 RUNS | ≧50 |
| 57 | 10 | $Al_2O_3$ | 700 | CRACKS BY THREE RUNS AND PARTIAL PEELING BY FIVE RUNS | ≧50 |
| 58 | 10 | $Al_2O_3$ | 1000 | CRACKS AND PEELING BY ONE RUN | ≧50 |

Although the coating films were partly peeled off by several times of uses in the sample Nos. 51 and 52 having too thin insulation coating films, scores of repeated uses were possible in the sample Nos. 53 to 56 having the insulation coating films with a thickness of 20 μm or more. When the insulation coating film is too thick as in the sample Nos. 57, and 58, on the other hand, cracks and peeling of the coating films were observed after several times of uses to contaminate the films.

The present invention constructed as hitherto described allows the cold crucible induction melting apparatus to collectively melt the melting raw material having various configurations while enabling the composition to be adjusted in the melt, thus making a mass production of highly pure and homogeneous metals and alloys possible in an industrial scale. The tapping rate can be aggressively controlled in tapping after melting, allowing the method to be readily applied to various casting processes such as a continuous casting besides enabling casting to be halted on its way, thus providing a melting apparatus and tapping method that can resume tapping within a short period of time.

What is claimed is:

1. A method of melting and tapping a solidified mass, comprising the steps of:

providing a cold crucible induction melting apparatus having a crucible with an inner diameter D of at least 400 mm, and a conductive metal melting coil wound around a circumference of the crucible;

inputting an electric current through the melting coil so as to melt the solidified mass in the crucible; and setting a frequency F of a power supply providing the electric current such that $$7.8-2\log(D)<\log(F)<8.7-2\log(D).$$

2. The method according to claim 1, further comprising the steps of:

providing a tapping nozzle attached to the crucible with a tapping coil wound around the tapping nozzle; and inputting an electric current through the tapping coil to heat-melt residue of the melt in the tapping nozzle.

3. The method according to claim 1, further comprising the step of controlling a tapping rate by detecting the height of the melt and controlling the electric current through the melting coil so as to control the height of the melt.

4. The method according to claim 3 wherein the step of controlling the tapping rate includes holding the tapping rate constant by maintaining the height of the melt at a constant level.

5. The method according to claim 1 wherein tapping is halted by reducing the electric current through the tapping coil and tapping is resumed by increasing the electric current through the tapping coil.

* * * * *